US012488046B1

United States Patent
Hansen et al.

(10) Patent No.: US 12,488,046 B1
(45) Date of Patent: Dec. 2, 2025

(54) WORKFLOW CONTENT GENERATION VIA VIDEO ANALYSIS

(71) Applicant: Lenovo (United States) Inc., Morrisville, NC (US)

(72) Inventors: Andrew Hansen, Morrisville, NC (US); Vikram Sharma, Morrisville, NC (US); Sarang Deshpande, Morrisville, NC (US); Sriram C Thota, Morrisville, NC (US)

(73) Assignee: Lenovo (United States) Inc., Morrisville, CA (US)

( * ) Notice: Subject to any disclaimer, the term of this patent is extended or adjusted under 35 U.S.C. 154(b) by 0 days.

(21) Appl. No.: 18/903,909

(22) Filed: Oct. 1, 2024

(51) Int. Cl.
  *G06F 16/738* (2019.01)
  *G06V 20/40* (2022.01)
  *G06V 20/62* (2022.01)
  *G10L 15/183* (2013.01)
  *G10L 25/57* (2013.01)

(52) U.S. Cl.
  CPC ............ *G06F 16/738* (2019.01); *G06V 20/49* (2022.01); *G06V 20/635* (2022.01); *G10L 15/183* (2013.01); *G10L 25/57* (2013.01)

(58) Field of Classification Search
  None
  See application file for complete search history.

(56) References Cited

U.S. PATENT DOCUMENTS

| | | | |
|---|---|---|---|
| 8,566,315 B1* | 10/2013 | Davtchev | G06F 16/78 707/736 |
| 9,342,559 B1* | 5/2016 | Jedrzejowicz | G06Q 30/016 |
| 9,612,726 B1* | 4/2017 | Chelba | G06F 3/0484 |
| 9,672,280 B2* | 6/2017 | Liu | G06F 16/739 |
| 2012/0320091 A1* | 12/2012 | Rajaraman | H04N 21/44012 345/629 |
| 2015/0153906 A1* | 6/2015 | Liao | G06F 16/7837 715/709 |
| 2016/0070962 A1* | 3/2016 | Shetty | G06F 16/7834 382/225 |
| 2020/0185006 A1* | 6/2020 | Tene | G11B 27/102 |
| 2021/0097288 A1* | 4/2021 | Fan | G06F 16/78 |

* cited by examiner

*Primary Examiner* — Richard L Bowen
(74) *Attorney, Agent, or Firm* — John M. Rogitz; John L. Rogitz (57) ABSTRACT

In one aspect, a device includes a processor system and storage accessible to the processor system. The storage includes instructions executable by the processor system to, responsive to a user query, parse data related to a source video to identify discrete steps that conform to the user query. The discrete steps are steps in a workflow indicated in the source video. Based on identifying the discrete steps, the instructions are then executable to present, on a display, text and images that indicate the discrete steps. The text and images are different from the source video itself but are derived from the source video. In one particular example, the instructions may even be executable to use a large language model (LLM) to execute retrieval-augmented generation (RAG) to present, on the display, the text and images in conformance with the user query.

20 Claims, 7 Drawing Sheets

WORKFLOW CONTENT GENERATION VIA VIDEO ANALYSIS

FIELD

The disclosure below relates to technically inventive, non-routine solutions that are necessarily rooted in computer technology and that produce concrete technical improvements. In particular, the disclosure below relates to techniques for digital workflow content generation via video analysis.

BACKGROUND

As recognized herein, for users interested in learning how to perform a complex task, online instructional videos are often very useful. Tasks can include anything from equipment maintenance to software development introductions and more. However, despite being readily available, these online videos are not always optimized for user consumption based on individual circumstances and user needs. For instance, it may be difficult to watch an instructional video when the user is in a particularly noisy environment where the video's audio track may not be readily audible. It might also be difficult or impossible for the user to perform the task at the same pace as the video itself, which often leads to frequent pausing and resuming of playback and even unnecessary re-watching of prior portions of the video due to imprecise rewinding. No adequate solutions currently exist to the foregoing computer-related, technological problems.

SUMMARY

Accordingly, in one aspect a device includes a processor system and storage accessible to the processor system. The storage includes instructions executable by the processor system to, responsive to a user query, parse data related to a video to identify discrete steps that conform to the user query. The discrete steps are steps in a workflow indicated in the video. The instructions are then executable to present, on a display, a first step of the discrete steps in first text and to present a first image of a first object indicated in the video. The first object is associated with the first step. The instructions are further executable to receive a user command to proceed from the first step to a second step of the discrete steps and, based on receipt of the user command, present on the display the second step in second text and present a second image of a second object indicated in the video. The second object is associated with the second step.

In one example embodiment, the instructions may be executable to use a large language model (LLM) to execute retrieval-augmented generation (RAG) to present, on the display, the first and second steps in conformance with the user query.

Also in an example embodiment, the instructions may be executable to parse the video to identify discrete steps in the workflow using speech-to-text software and natural language processing. If desired, the instructions may be further executable to parse the video to identify discrete steps in the workflow using action recognition software. Based on identifying the discrete steps, the instructions may then be executable to chunk the video into different segments that are associated with different discrete steps. In particular non-limiting instances, the instructions may then be executable to embed the different segments in vector space for a large language model (LLM) to retrieve and present one or more of the segments in conformance with the user query.

In various example implementations, the first and second text may be identified from the video itself. For example, the first and second text may be identified from audio of the video and/or from third text in the video (e.g., subtitles).

In certain instances, the first object may be different from the second object. Also in certain instances, the device may include the display.

In another aspect, a method includes, responsive to a user query, parsing data related to a video to identify discrete steps that conform to the user query. The discrete steps are steps in a workflow indicated in the video. The method then includes, based on identifying the discrete steps, presenting, on a display, text and images that indicate the discrete steps. The text and images are different from the video itself.

In some examples, the method may further include using a large language model (LLM) to present, in conformance with the user query, the text and images.

Also in some examples, the method may include parsing the video to identify discrete steps in the workflow using natural language processing and action recognition software. From there, if desired the method may include, based on identifying the discrete steps, embedding, in vector space, data indicating different segments of the video that are associated with different respective discrete steps for a large language model (LLM) to present one or more of the segments in conformance with the user query.

In various example instances, the text may be identified from the video.

In still another aspect, at least one computer readable storage medium (CRSM) that is not a transitory signal includes instructions that are executable by a processor system. The instructions are executable to, responsive to a user query, parse data related to a video to identify discrete steps that conform to the user query. The discrete steps are steps in a workflow indicated in the video. The instructions are also executable to, based on identifying the discrete steps, present, on a display, text and images that indicate the discrete steps. The text and images are different from the video.

If desired, in some examples the instructions may be executable to use a large language model (LLM) to present, in conformance with the user query, the text and images.

Also in some examples, the instructions may be executable to parse the video to identify discrete steps in the workflow using natural language processing and action recognition software. The instructions may then be executable to, based on identifying the discrete steps, embed, in vector space, data indicating different segments of the video that are associated with different respective discrete steps for a large language model (LLM) to present one or more of the segments in conformance with the user query.

The details of present principles, both as to their structure and operation, can best be understood in reference to the accompanying drawings, in which like reference numerals refer to like parts, and in which:

DETAILED DESCRIPTION

Among other things, present principles recognize that computer-generated step-by-step workflows can become particularly beneficial in light of the problems highlighted above, since users can read instructional text while still benefiting from supplemental media tailored to each specific step (including images, videos, and more). The computer-generated workflows may even be generated in a standardized file format so that the same computer-generated workflow can be used across different software applications ("apps") and device platforms (e.g., mobile devices such as smartphones, personal computers such as laptop computers, and headsets such as extended reality (XR) headsets). For example, JavaScript Object Notation (JSON) format may be used.

Accordingly, the detailed description below discusses analyzing existing instructional videos for source content, with the process including the following. First, creating instructional content in a video format if the video does not exist already. Second, converting the video contents into text. Third, utilizing text and audio/video analysis (e.g., NLP and machine learning techniques) to chunk the video into semantically sensible segments, then creating embeddings for those chunks to make them available to an LLM via semantic search (with embeddings being referenced via the vector database). Fourth, when prompted by a user query, the device will have the LLM generate properly-formatted workflow content based on the embeddings and video segments themselves. Fifth, using a workflow viewer application, the device will allow the user to view the generated workflow(s).

For the second and third aspects mentioned above, videos may be ingested by the system so that contents can be converted into text, and audio/video analysis can help finish the process of segmenting the video. Relevant instructional material may be determined by using a combination of technologies to determine video contents, which may include but are not limited to:

Speech-to-text (STT) software for spoken voiceovers in the video;

Object character recognition (OCR) for text displayed in video frames of the video; and Convolutional neural networks (CNNs) for determining identification and activity of objects and people on screen/in the video.

Thus, once a user query is received, the query may prompt a retrieval-augmented generation (RAG) framework to search the vector database and provide the relevant segments and text to the LLM, and then the LLM may generate an output including a series of step-by-step instructions in the proper workflow-compliant format.

Therefore, the LLM may recreate and organize the steps shown in the video, but formatted as needed for use with a given workflow application and the given user's needs. Each step in the workflow may thus correspond to one of the segments generated during the chunking, and may be populated with instructional text and supportive media which can be captured from the video and/or generated by the system.

In one non-limiting example, this results in the following for each discrete step of the workflow: First, instructional text is generated from the video (e.g., re-worded by the LLM for brevity and clarity). Second, supplemental media is used for visual aid, which can include images from the original source (e.g., based on whole captured frames or individual objects detected by the CNN), video snippets (e.g., short segments from the source video), and/or images of relevant objects which can be generated by a diffuser model (e.g., Dall-E) based on video transcript descriptions (where generated images can potentially range from two-dimensional black and white or color images that mimic traditional drawings found in hardware manuals to complex full-color 3D models with additional animations that show the relevant component and/or action for the current step). Third, the device may link to the original source video at the timestamp of the corresponding segment itself so users can easily find the original source content if desired.

Thus, depending on the needs at the time of content generation, the LLM can be prompted to output for one or more specific workflow viewer applications. One of the strengths of present principles is in the fact that this process can be re-run at any time in order to accommodate any new workflow formats that become needed by the user. And not only is this process applicable for newly-created content, but it can also be applied to older preexisting content as well to back-create workflows from an existing catalog of instructional videos that may already exist.

Prior to delving further into the details of the instant techniques, note with respect to any computer systems discussed herein that a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple Inc. of Cupertino CA, Google Inc. of Mountain View, CA, or Microsoft Corp. of Redmond, WA. A Unix® or similar such as Linux® operating system may be used, as may a Chrome or Android or Windows or macOS or iOS operating system. These operating systems can execute one or more browsers such as a browser made by Microsoft or Google or Mozilla or another browser program that can access web pages and applications hosted by Internet servers over a network such as the Internet, a local intranet, or a virtual private network.

As used herein, instructions refer to computer-implemented steps for processing information in the system. Instructions can be implemented in software, firmware or hardware, or combinations thereof and include any type of programmed step undertaken by components of the system; hence, illustrative components, blocks, modules, circuits, and steps are sometimes set forth in terms of their functionality.

A processor may be any single- or multi-chip processor that can execute logic by means of various lines such as address lines, data lines, and control lines and registers and shift registers. Moreover, any logical blocks, modules, and circuits described herein can be implemented or performed with a system processor such as a central processing unit (CPU), a graphics processing unit (GPU), a neural processing unit (NPU), a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can also be implemented by a controller or state machine or a combination of computing devices. Thus, the methods herein may be implemented as software instructions executed by a processor, suitably configured application specific integrated circuits (ASIC) or field programmable gate array (FPGA) modules, or any other convenient manner as would be appreciated by those skilled in the art. Where employed, the software instructions may also be embodied in a non-transitory device that is being vended and/or provided, and that is not a transitory, propagating signal and/or a signal per se. For instance, the non-transitory device may be or include a hard disk drive, solid state drive, or CD ROM. Flash drives may also be used for storing the instructions. Additionally, the software code instructions may also be downloaded over the Internet (e.g., as part of an application ("app") or software file). Accordingly, it is to be understood that although a software application for undertaking present principles may be vended with a device such as the system 100 described below, such an application may also be downloaded from a server to a device over a network such as the Internet. An application can also run on a server and associated presentations may be displayed through a browser (and/or through a dedicated companion app) on a client device in communication with the server.

Software modules and/or applications described by way of flow charts and/or user interfaces herein can include various sub-routines, procedures, etc. Without limiting the disclosure, logic stated to be executed by a particular module can be redistributed to other software modules and/or combined together in a single module and/or made available in a shareable library. Also, the user interfaces (UI)/graphical UIs described herein may be consolidated and/or expanded, and UI elements may be mixed and matched between UIs.

Logic when implemented in software, can be written in an appropriate language such as but not limited to hypertext markup language (HTML)-5, Java®/JavaScript, C# or C++, and can be stored on or transmitted from a computer-readable storage medium such as a hard disk drive (HDD) or solid state drive (SSD), a random access memory (RAM), read-only memory (ROM), electrically erasable programmable read-only memory (EEPROM), a hard disk drive or solid state drive, compact disk read-only memory (CD-ROM) or other optical disk storage such as digital versatile disc (DVD), magnetic disk storage or other magnetic storage devices including removable thumb drives, etc.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

The term "a" or "an" in reference to an entity refers to one or more of that entity. As such, the terms "a" or "an", "one or more", and "at least one" can be used interchangeably herein.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

The term "circuit" or "circuitry" may be used in the summary, description, and/or claims. The term "circuitry" includes all levels of available integration, e.g., from discrete logic circuits to the highest level of circuit integration such as VLSI, and includes programmable logic components programmed to perform the functions of an embodiment as well as processors (e.g., special-purpose processors) programmed with instructions to perform those functions.

Now specifically in reference to FIG. 1, an example block diagram of an information handling system and/or computer system 100 is shown that is understood to have a housing for the components described below. Note that in some embodiments the system 100 may be a desktop computer system, such as one of the ThinkCentre®, or notebook computer system, such as ThinkPad® series of personal computers sold by Lenovo (US) Inc. of Morrisville, NC, or a workstation computer, such as the ThinkStation®, which are sold by Lenovo (US) Inc. of Morrisville, NC; however, as apparent from the description herein, a client device, a server or other machine in accordance with present principles may include other features or only some of the features of the system 100. Also, the system 100 may be, e.g., a game console such as XBOX®, and/or the system 100 may include a mobile communication device such as a mobile telephone, notebook computer, and/or other portable computerized device.

Figure 1:
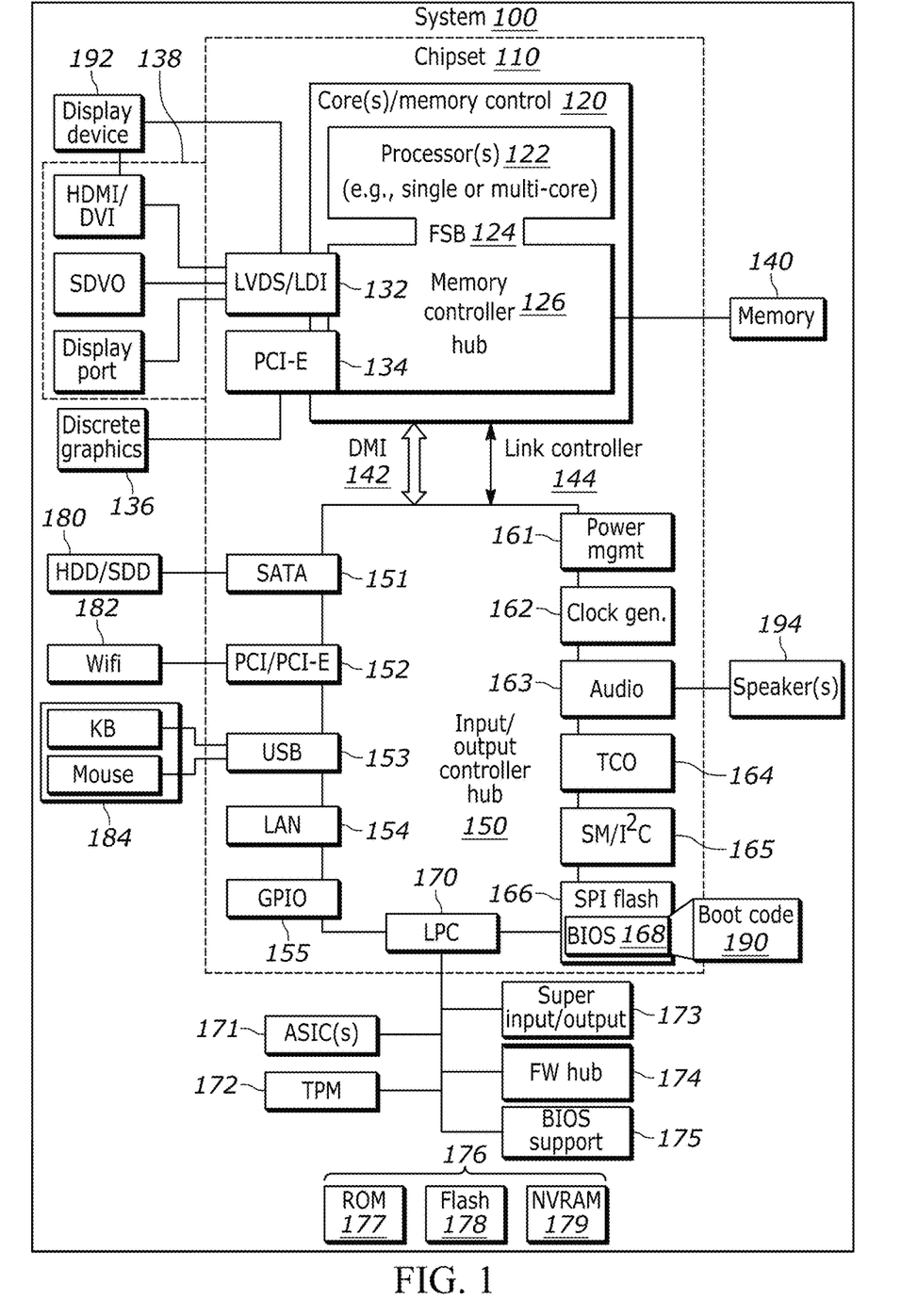
FIG. 1 is a block diagram of an example system consistent with present principles.

As shown in FIG. 1, the system 100 may include a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 includes a processor system 122 (e.g., one or more single core or multi-core processors, etc.) and a memory controller hub 126 that exchange information via a front side bus (FSB) 124. A processor system such as the system 122 may therefore include one or more processors acting independently or in concert with each other to execute an algorithm, whether those processors are in one device or more than one device. Additionally, as described herein, various components of the core and memory control group 120 may be integrated onto a single processor die, for example, to make a chip that supplants the "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 can further include a low-voltage differential signaling interface (LVDS) 132. The LVDS 132 may be a so-called LVDS Display Interface (LDI) for support of a display device 192 (e.g., a CRT, a flat panel, a projector, a touch-enabled light emitting diode (LED) display or other video display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. For example, the memory controller hub 126 may include a 16-lane (×16) PCI-E port for an external PCI-E-based graphics card (including, e.g., one or more GPUs). An example system may thus include PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more universal serial bus (USB) interfaces 153, a local area network (LAN) interface 154 (more generally a network interface for communication over at least one network such as the Internet, a WAN, a LAN, a Bluetooth network using Bluetooth 5.0 communication, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes basic input/output system (BIOS) 168 and boot code 190. With respect to network connections, the I/O hub controller 150 may include integrated gigabit Ethernet controller lines multiplexed with a PCI-E interface port. Other network features may operate independent of a PCI-E interface. Example network connections include Wi-Fi as well as wide-area networks (WANs) such as 4G and 5G cellular networks.

The interfaces of the I/O hub controller 150 may provide for communication with various devices, networks, etc. For example, where used, the SATA interface 151 and/or PCI-E interface 152 provide for reading, writing or reading and writing information on one or more drives 180 such as HDDs, SSDs or a combination thereof, but in any case the drives 180 are understood to be, e.g., tangible computer readable storage mediums that are not transitory, propagating signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

Additionally, though not shown for simplicity, in some embodiments the system 100 may include a gyroscope that senses and/or measures the orientation of the system 100 and provides related input to the processor system 122, an accelerometer that senses acceleration and/or movement of the system 100 and provides related input to the processor system 122, and/or a magnetometer that senses and/or measures directional movement of the system 100 and provides related input to the processor system 122.

Still further, the system 100 may include an audio receiver/microphone that provides input from the microphone to the processor system 122 based on audio that is detected, such as via a user providing audible input to the microphone. The system 100 may also include a camera that gathers one or more images and provides the images and related input (e.g., metadata like an image timestamp) to the processor system 122. The camera may be a thermal imaging camera, an infrared (IR) camera, a digital camera such as a webcam, a three-dimensional (3D) camera, and/or a camera otherwise integrated into the system 100 and controllable by the processor system 122 to gather still images and/or video.

Also, the system 100 may include a global positioning system (GPS) transceiver that is configured to communicate with satellites to receive/identify geographic position information and provide the geographic position information to the processor system 122. However, it is to be understood that another suitable position receiver other than a GPS receiver may be used in accordance with present principles to determine the location of the system 100.

It is to be understood that an example client device or other machine/computer may include fewer or more features than shown on the system 100 of FIG. 1. In any case, it is to be understood at least based on the foregoing that the system 100 is configured to undertake present principles.

Present principles may employ various machine learning models, including deep learning models. Machine learning models consistent with present principles may use various algorithms trained in ways that include supervised learning, unsupervised learning, semi-supervised learning, reinforcement learning, feature learning, self-learning, and other forms of learning. Examples of such algorithms, which can be implemented by computer circuitry, include one or more neural networks, such as a convolutional neural network (CNN), a recurrent neural network (RNN), and a type of RNN known as a long short-term memory (LSTM) network. Generative pre-trained transformers (GPTT) also may be used. Support vector machines (SVM) and Bayesian networks also may be considered to be examples of machine learning models. In addition to the types of networks set forth above, models herein may be implemented by classifiers.

As understood herein, performing machine learning may therefore involve accessing and then training a model on training data to enable the model to process further data to make inferences. An artificial neural network trained through machine learning may thus include an input layer, an output layer, and multiple hidden layers in between that are configured and weighted to make inferences about an appropriate output.

Figure 2:
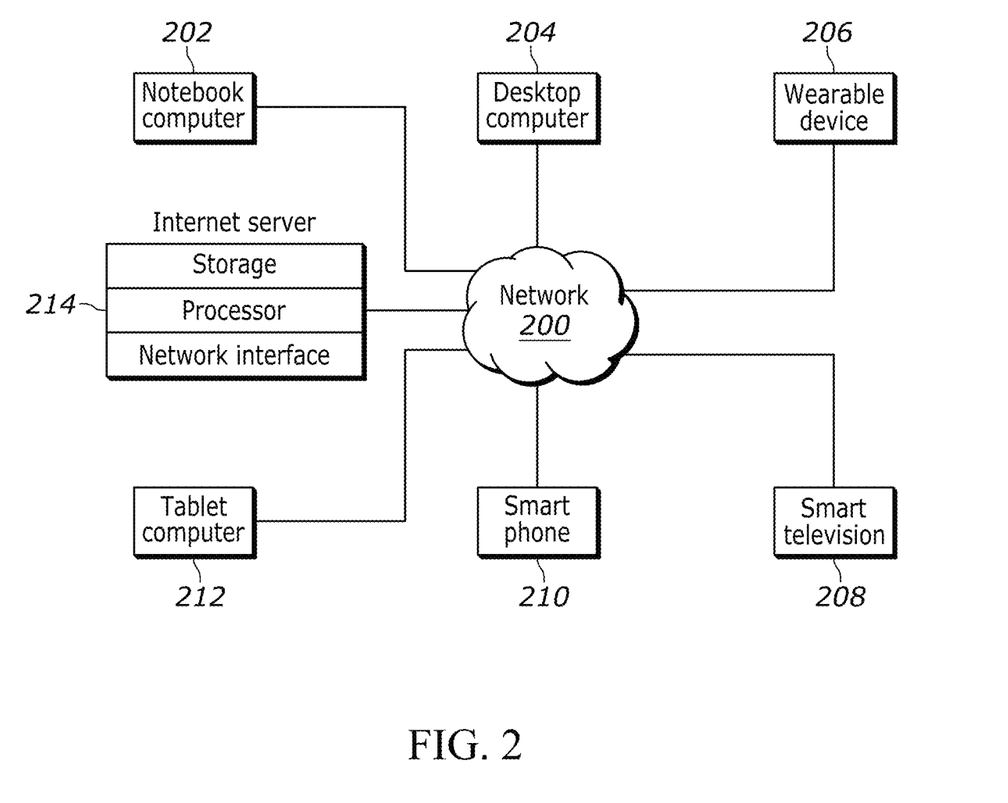
FIG. 2 is a block diagram of an example network of devices consistent with present principles.

Turning now to FIG. 2, example devices are shown communicating over a network 200 such as the Internet to undertake present principles. It is to be understood that each of the devices described in reference to FIG. 2 may include at least some of the features, components, and/or elements of the system 100 described above. Indeed, any of the devices disclosed herein may include at least some of the features, components, and/or elements of the system 100 described above.

FIG. 2 shows a notebook computer and/or convertible computer 202, a desktop computer 204, a wearable device 206 such as a smart watch, a smart television (TV) 208, a smart phone 210, a tablet computer 212, and a server 214 such as an Internet server that may provide cloud storage accessible to the devices 202-212. It is to be understood that the devices 202-214 may be configured to communicate with each other over the network 200 to undertake present principles.

Figure 3:
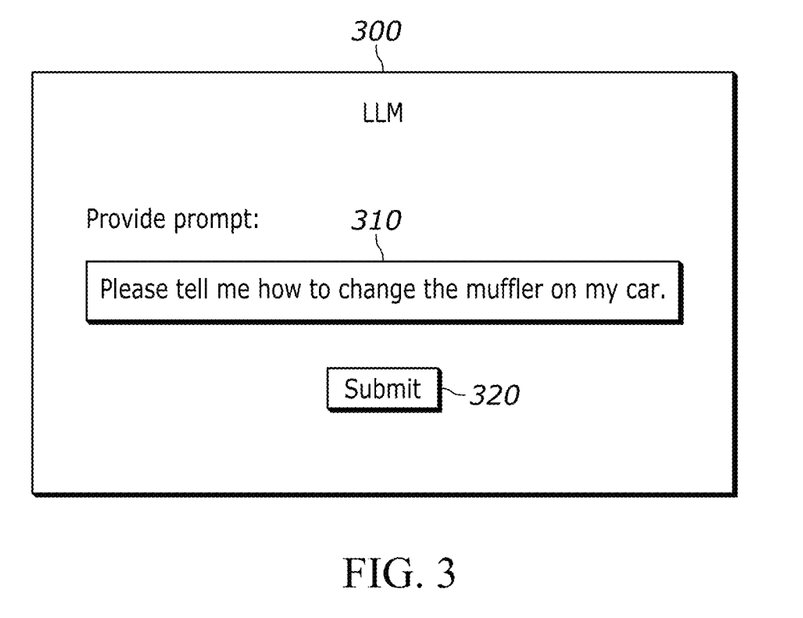
FIG. 3 shows an example graphical user interface (GUI) through which an end-user may enter a prompt to an LLM consistent with present principles.

Now in reference to FIG. 3, suppose an end-user wants to know the workflow for replacing a muffler on the user's vehicle. Since Internet videos on the subject would move faster than the user themselves could move, and since the user would not be able to effectively pause and rewind with grease and vehicle dirt on the user's hands, the online video itself is not sufficient. Accordingly, consistent with present principles, the user may open a dedicated app for an LLM, access an online portal for the LLM, or otherwise access the LLM to reach the graphical user interface (GUI) 300 shown in FIG. 3.

As shown in this figure, the GUI 300 may include a text entry box 310 into which the user can enter a query via hard or soft keyboard. In the present example, the user query is, "Please tell me how to change the muffler on my car." The user may then select the submit selector 320 to provide the prompt as input to a large language model (LLM) or other software that is executing consistent with present principles.

In response to receiving the user's query, the LLM may then seek out workflow steps to help the user, whether those steps are sourced from one distinct video/video file or more than one. For the present example, assume a single video file from a video-sharing website like YouTube. However, present principles still encompass sourcing discrete steps from more than one online video in non-limiting embodiments, where steps from each source video are mixed and matched to create a complete step-by-step workflow without duplicate steps.

Figure 4:
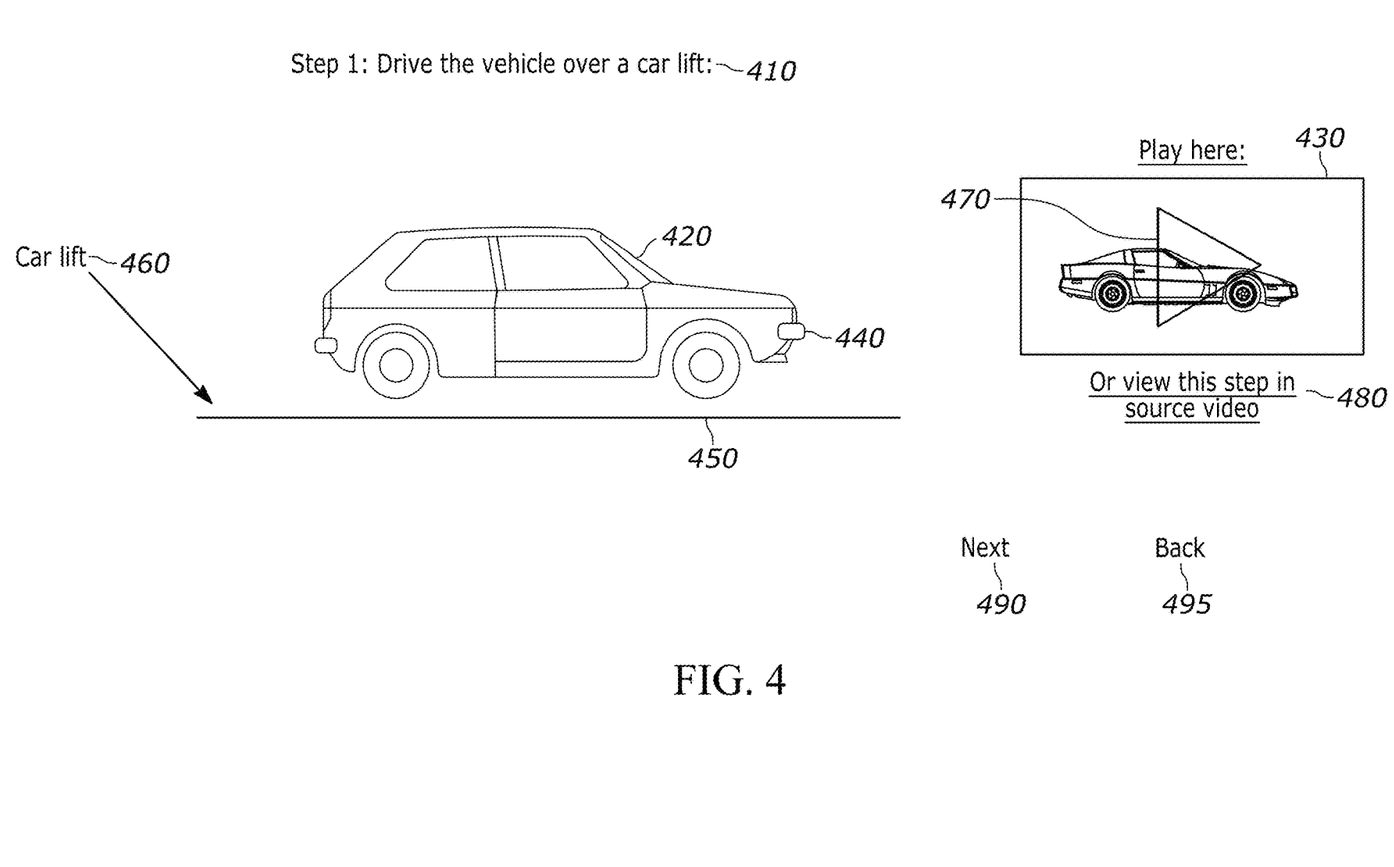
FIGS. 4 and 5 show different GUIs that may be presented for different discrete steps of a workflow as derived from a source video consistent with present principles.

FIG. 4 then shows that a first step in the workflow may be presented on the display of the user's client device via a GUI 400. The first step may be shown via both first text 410 and first images 420, 430 as shown. The first text 410 may be text derived from audio of the instructional source video itself, whether the text 410 is a result of speech-to-text software (and hence establishes subtitle text) or the result of the LLM synthesizing the speech-to-text result to generate different text that summarizes the audio's speech as a discrete, single-sentence step. Or the text 410 may be taken or derived from existing subtitle text that accompanies the video itself. Additionally, note that in some examples the text 410 may be selectable to command the device to present a more-detailed and lengthy version of the instruction for the first step on the GUI 400 (e.g., a multi-sentence description of the first step), as may also be determined by the LLM.

The image 420 may be a generative image from a generative image model, such as DALL-E, Stable Diffusion, or another artificial intelligence-based generative image model. As shown, the generative image 420 may show a vehicle 440, a car lift 450 in the down position, and a text/arrow combination 460 emphasizing use of the car lift 450 at this step (driving the vehicle over the car lift). Note that the generative image 420 itself may have been generated by the system based on the system taking data it has recognized from the source video itself (e.g., for the first step only) and providing it as a prompt to the generative image model, with the prompt describing in words certain objects from the source video as well as their spatial relationship to each other and actions in relation to each other (e.g., a vehicle driven over top of a car lift per this example).

The image 430 may be a still frame from the source video itself as selected from the portion of the source video showing the first step. The image 430 may be accompanied on the GUI 400 by a "play here" instruction, with the user being able to select the "play" selector 470 to then play the segment of the source video that shows the first step of the workflow being performed. Thus, selection of the selector 470 may command the system to play the video in the GUI 400 itself at the location of the image 430. However, should the user wish to navigate to the source video itself, the user may select the hyperlink 480 to do so.

The hyperlink 480 may be a link not just to the original source video itself (on whatever third party website or platform might be hosting the video), but a link to the source video for video playback to start at the beginning of the particular segment directed to the current step of the workflow that the user is on (step one here). Thus, responsive to selection of the hyperlink 480, the system may open another app or navigate via web browser to the source video and then autonomously begin playback of the source video at the starting playback position of the video segment showing the current step of the workflow, which may not be the beginning of the video itself but a playback position occurring at a later playback time. E.g., even for the first step in the workflow per FIG. 4, playback may begin at the 0:30 mark, with the system skipping over introductory remarks at the very beginning of the video.

Figure 5:
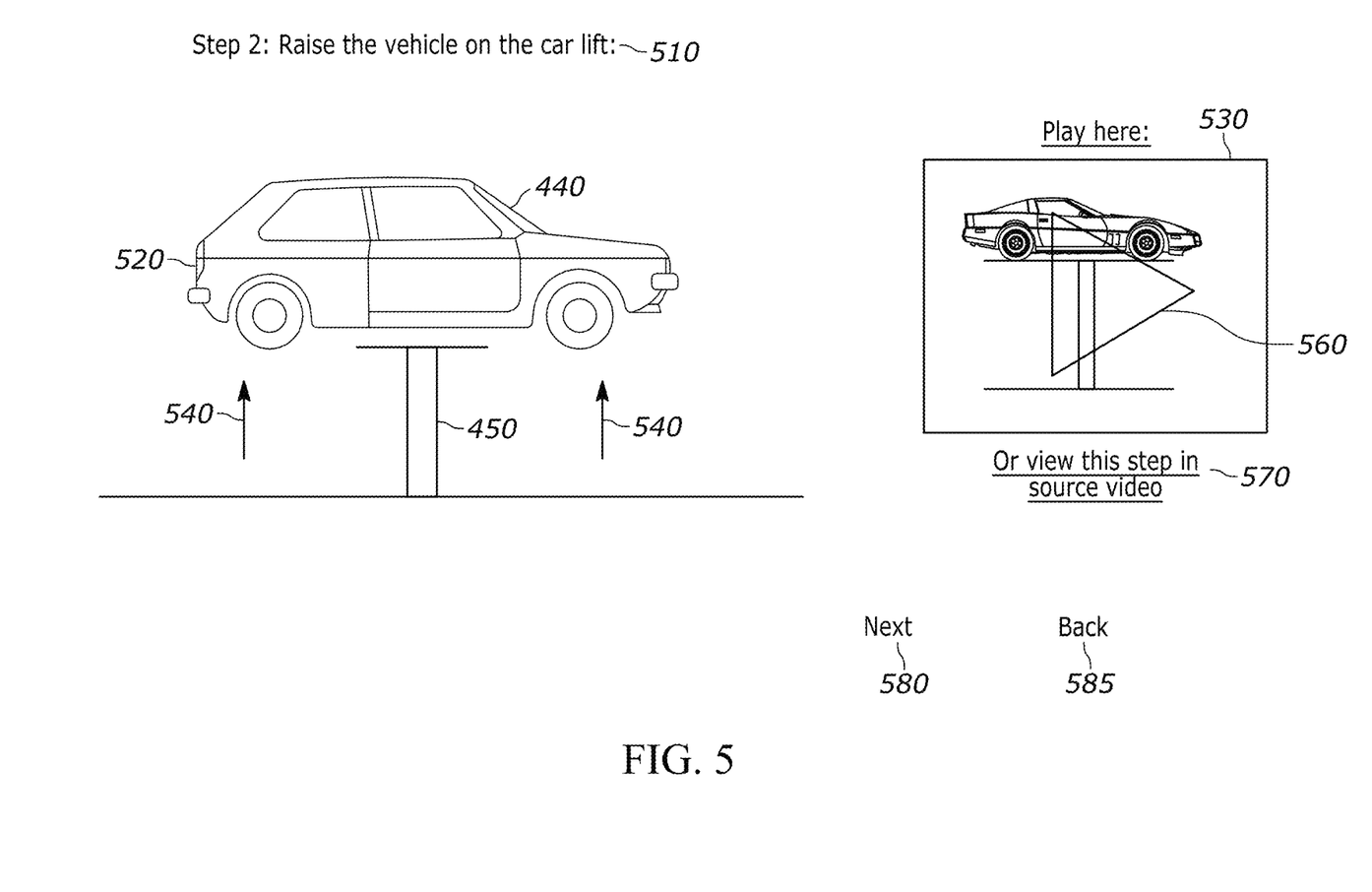

Then once the user is ready to move on in the workflow to the next step, the user may select the "next" selector 490 to command the system to present the GUI 500 of FIG. 5 in response. Or if the user wishes to go back to a previous step, the "back" selector 495 may be selected instead. Voice commands may also be used to go back or proceed to the next step.

The GUI 500 therefore shows the next (second) step being presented on the display of the user's client device. As with the first step, the second step may be shown via both second text 510 and second images 520, 530. The second text 510 may also be text derived from audio of the instructional source video itself, as determined in a manner similar to the first text 410 as set forth above. Or the text 510 may be taken or derived from existing subtitle text that accompanies the video itself. Additionally, in some examples the text 510 may be selectable to command the device to present a more-detailed and lengthy version of the instruction for the second step on the GUI 500 (e.g., a multi-sentence description of the second step), as may also be determined by the LLM.

The image 520 may be another generative image from the generative image model. As shown, the generative image 520 may show the vehicle 440, car lift 450 in the up position this time, and motion arrows emphasizing lifting the vehicle 440 in the air at this step (using the car lift). Note that the generative image 520 itself may have also been generated by the system based on the system taking data it has recognized from the source video itself (e.g., for the second step only) and providing it as a prompt to the generative image model, with the prompt again describing in words certain objects from the source video as well as their spatial relationship to each other and actions in relation to each other (e.g., a vehicle being lifted up in the air by a car lift per this example).

The image 530 may be a still frame from the source video itself as selected from the portion of the source video showing the second step, and therefore the image 530 may be different from the image 430. The image 530 as shown in FIG. 5 may be accompanied on the GUI 500 by a "play here" instruction, with the user being able to select the "play" selector 560 to then play the (different) segment of the source video that shows the second step of the workflow being performed. Thus, selection of the selector 560 may command the system to play the video in the GUI 500 itself at the location of the image 530. However, should the user wish to navigate to the source video itself, the user may select the hyperlink 570 to do so.

Similar to the link 480, the hyperlink 570 may be a link not just to the original source video itself, but a link to the source video for video playback to start at the beginning of the particular segment directed to the current step of the workflow that the user is on (step two here). Thus, responsive to selection of the hyperlink 570, the system may open another app or navigate via web browser to the source video and then autonomously begin playback of the source video at the starting playback position of the video segment showing the current step of the workflow, which again may not be the beginning of the video itself but a playback position occurring at a later playback time. In fact, per the example of FIG. 5, the starting position at which playback is initiated based on selection of the hyperlink 570 is a later playback position in the video timeline than the playback position associated with the hyperlink 480.

Then once the user is ready to move on in the workflow to the next (third) step, the user may select the "next" selector 580 to command the system to present another GUI in response. Or if the user wishes to go back to a previous step, the "back" selector 585 may be selected instead. This process may then continue as the user works the user's way through each step in the workflow for changing the user's muffler.

Figure 6:
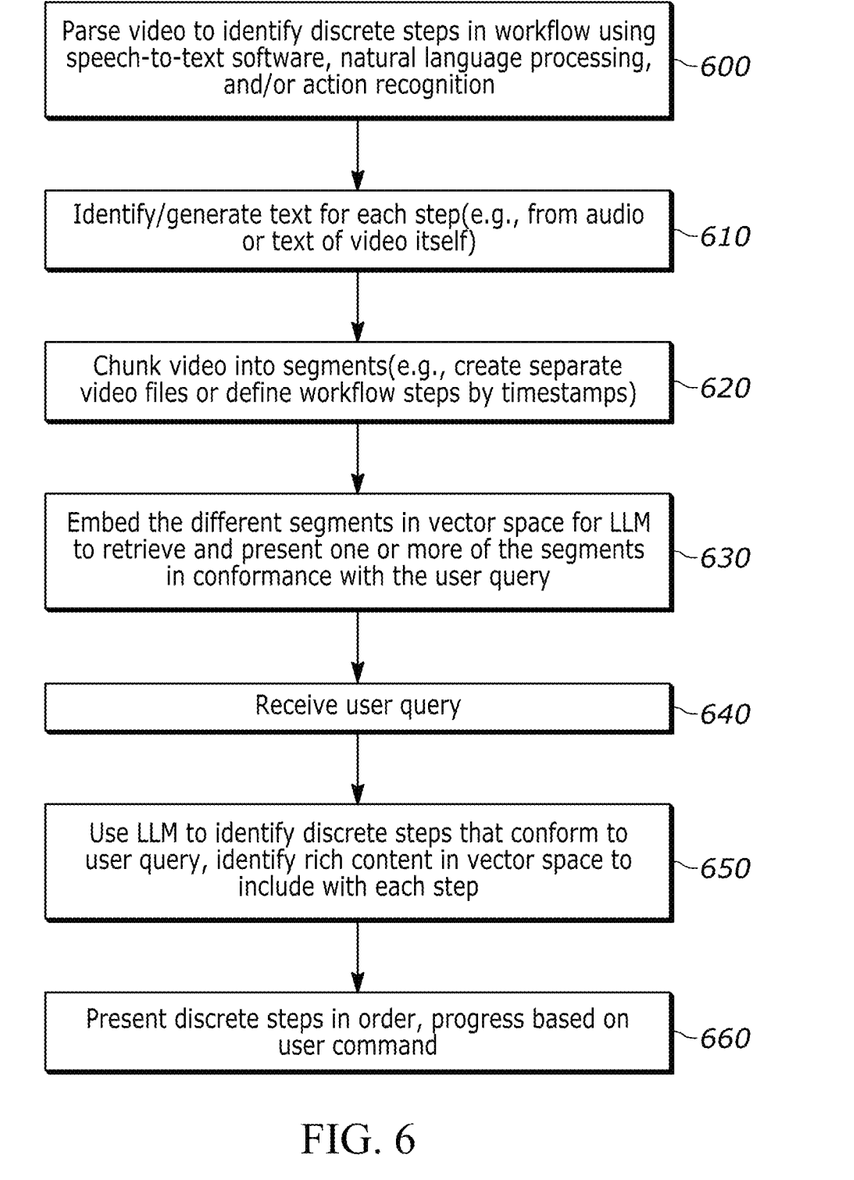
FIG. 6 illustrates example logic in example flow chart format that may be executed by a device consistent with present principles.

Before moving on to FIG. 6, note with respect to FIGS. 3-5 that in some examples, the user might not want to start from a beginning step of a workflow as set forth in the source video itself. For example, suppose the user already knows how to load the vehicle onto the car lift and then actuate the car lift to lift the vehicle up in the air. In this circumstance, the user might provide a different prompt via the GUI 300, such as "show me how to unbolt an older muffler and replace it with a new muffler." Upon receiving this prompt, the LLM might use the same source video as described above, but skip steps one and two outlined above and instead initially present the user with a third step from the source video that explicitly demonstrates to the user how to unbolt the old muffler from the vehicle. Thus, it is to be understood more generally consistent with present principles that the LLM that is used is able to dynamically tailor workflow steps presented to the user based on the user's prompt and will not necessarily present all steps of a workflow that are shown in a source video, instead only presenting those requested or needed by the user based on the user's prompt. This has the advantage of delivering to the user specific digital content that is relevant to the user themselves without mixing in other digital content that the user has not requested and that the user does not need, which is a technical improvement over existing digital video delivery.

Referring now to FIG. 6, this figure shows example logic that may be executed by a device such as the system 100 and/or a coordinating server alone or in any appropriate combination consistent with present principles. Thus, in some examples the logic may be executed by a client device alone. In other examples, the logic may be executed by the remotely-located server alone. In still other examples, the logic may be executed by a client device and remotely-located server, where the client device performs some steps while the server performs other steps, and/or where the client device and server work together to perform a given step. Note that while the logic of FIG. 6 is shown in flow chart format, other suitable logic may also be used (e.g., state machine).

Beginning at block 600, the device may parse a source video indicating a workflow to identify discrete steps in the workflow. The device may do so using speech-to-text software to convert any audible speech in the audio component of the source video file to text for natural language processing to then be executed on the resulting text. For example, topic segmentation and recognition may be executed on the resulting text to identify different topics (workflow steps), as may natural language understanding to gain semantic understanding from the different steps shown in the source video.

Also at block 600, the device may execute image-based action recognition software to identify actions from the video component of the source video file itself. Discrete actions may therefore be identified from the video component for the system to then identify playback start and end times at which the respective action begins and ends. The identified start and end times may then be used to associate that video segment with a given discrete step of the workflow as identified by the system from the source video. And note here that the discrete step itself may be identified from the audio component of the source video as set forth above, from existing subtitle text as set forth above, and/or from the video component of the source video as also set forth above.

Therefore, in one particular example, each action identified from the video component may be assigned to a separate discrete step. As another example, multiple related actions identified from the video component may be assigned to a single discrete step (with the discrete step itself being identified from the audio component as described above).

It is to also be understood consistent with present principles that the video component of the source video may also include its own text, whether appearing on objects in the source video or in the form of embedded subtitles that accompany the original source video file (e.g., rather than the existing subtitles being in metadata accompanying the video component). Therefore, for text shown/embedded in the video, optical character recognition (OCR) may be executed to identify the text itself. The text (whether from OCR or metadata subtitles) may then be parsed similar to the audio component that is converted to text as set forth above (e.g., using NLP techniques such as topic modeling and natural language understanding) to thus identify a discrete step in the workflow.

From block 600 the logic may then proceed to block 610. At block 610 the device may identify text for each step that is to be presented to the user as a separate step of the workflow. For example, an LLM may be used to parse subtitle text of the source video as well as text sourced from the audio component of the source video (sourced through speech-to-text software) to then generate generative text having basis in the source video but not being explicitly indicated in the source video. Additionally or alternatively, text that maps to/is the same as subtitle text, OCR text, and/or spoken words from the source video may be identified at block 610 for inclusion as a step to the user.

The logic of FIG. 6 may then move to block 620. At block 620 the device may, based on identifying the discrete steps, chunk the source video into different segments that are associated with different discrete steps. Chunking the source video into different segments may include different techniques. In one example, chunking the source video may include using video editing software to create separate video files of the respective segment from the source video itself so that the separate video files may then be stored and accessed by the device as needed. In another example, chunking the source video may include storing start and end playback times for the respective segment so that the whole source video may be accessed at a later time, with the device skipping to a starting playback position for a given segment for the current step in the workflow (a workflow step being defined in part by the start and end timestamps). As another example, chunking the source video may include inserting playback markers into the original source video (or a copy thereof) so that scrolling through the playback timeline of the source video results in different markers for different workflow steps being presented throughout the scrolling (and playback) of the respective segment. Other examples for selectively using segments of the entire source video are also envisioned.

From block 620 the logic of FIG. 6 may then proceed to block 630. At block 630 the device may embed the different segments in vector space for a large language model (LLM) to later retrieve and present one or more of the segments in conformance with a user query. Various embedding models may therefore be used, including those for embedding rich content such as images and video segments from the source video into vector space. Note that the LLM itself may be one such as Chat GPT, Gemini, Claude, Llama, etc.

After block 630 the logic may then proceed to block 640. At block 640 during deployment of the LLM, the device may receive a user query (e.g., prompt) to the LLM. The logic may then proceed to block 650 where the device may use the LLM to execute retrieval-augmented generation (RAG) using the vector embeddings from block 630 to present, on the display of the user's device, steps in the relevant workflow in conformance with the user query. Thus, RAG may be used for the LLM to retrieve rich content like images and video segments for a given step from vector space to then pair the rich content with identified text for the relevant step itself (the text being identified at block 610 as set forth above). Also note that the LLM may be executed at block 630 to identify particular workflow steps being requested by the user to present only text for those steps (e.g., when the requested or indicated steps do not include all steps of the workflow as indicated in the source video itself but only a subset of steps needed or requested by the user).

After block 650 the logic may then proceed to block 660. At block 660 the device may, over time, present the discrete steps to the user in order of the workflow itself, with the device progressing from one step to another based on user command to proceed (e.g., selection of the "next" selector 490 or 580 as described above). In various example implementations, some or all steps presented to the user may include only text, while in other examples the steps may include any combination of the output types mentioned above (e.g., text, images, video, and/or 3D models).

Thus, according to blocks 650 and 660, the device may parse data related to a video responsive to the user query to identify discrete steps that conform to the user query, with the discrete steps being steps in the workflow indicated in the source video itself. The data that is parsed may include the text data generated by the device as well as the data in vector space. The device, based on identifying the discrete steps, may then present text and images that indicate the discrete steps, with the text and images being different from the source video itself. In one particular example, the device may present at least one respective image for each step, with the image indicating a respective object indicated in the video segment for that step and hence associated with that step. The object may therefore be the same or different between steps depending on the relationship between the workflow steps themselves. Taking the example of FIGS. 3-5 above, the objects may include a muffler and a car lift.

Accordingly, in various examples the respective image(s) for each step may show a frame of the video (and hence the associated object in that frame) and/or may even show the respective object as cut from the frame itself (hence not showing surrounding image portions in the same frame). Additionally or alternatively, the image may be established by a three-dimensional (3D) model of the respective object, with the 3D model itself being accessed over the Internet or derived in part from the respective object as shown in the source video (the 3D model being generated using a generative image model). The 3D model may then be used to present a 3D still image from a given perspective using the 3D model, and/or to even demonstrate the action the user should take at the respective step itself by animating the 3D model accordingly (e.g., show a muffler being unbolted from a vehicle mount according to the example above). Still further, the image may be a two-dimensional generative image as set forth in the example of FIGS. 4 and 5 above (the generative image 420 and 520). As one last example, the image showing the object may be one of many images presented as part of the relevant video segment, which might be auto-played for the user on the GUI 400 or 500 responsive to the user providing a command to proceed to that step (and hence responsive to the respective GUI for that step being presented).

Figure 7:
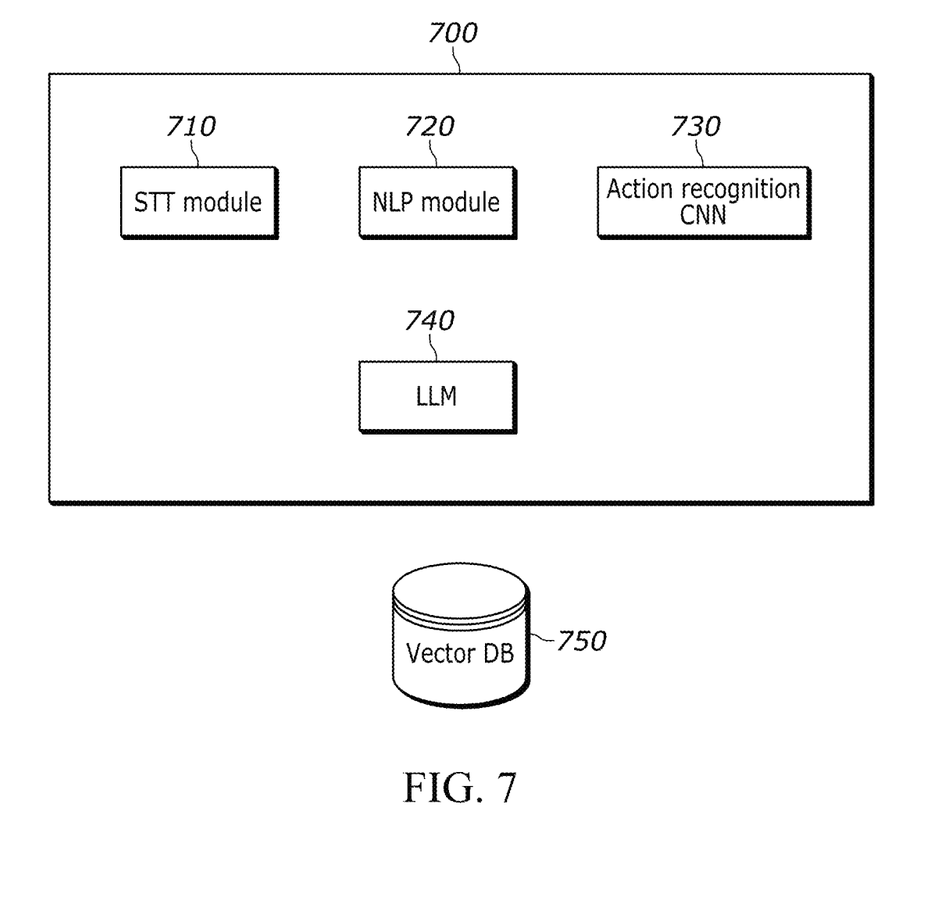
FIG. 7 illustrates example software architecture that may be implemented consistent with present principles.

Referring now to FIG. 7, example software architecture 700 is shown that may be implemented consistent with present principles. The architecture 700 may include a speech-to-text module with speech-to-text software for execution according to the description above. The architecture 700 may also include a natural language processing (NLP) module 720 with NLP software for execution according to the description above. The architecture 700 may further include an action recognition convolutional neural network (CNN) or other action recognition software for execution according to the description above.

As further shown in FIG. 7, the architecture 700 may include an LLM 740, also for execution according to the description above. Thus, the LLM 740 may access a vector database 750 that includes vectors represented in vector space according to the description above. The vector database 750 may be stored locally with the components 710-740 or may be stored at a separate device/storage location, such as in cloud storage hosted at a remotely-located server. And for that matter, further note that the components 710-740 themselves may be stored together or separate as distributed in the cloud.

It may now be appreciated that present principles provide for an improved computer-based user interface that increases the functionality and ease of use of the devices disclosed herein. The disclosed concepts are rooted in computer technology for computers to carry out their functions.

Components included in one embodiment can be used in other embodiments in any appropriate combination. For example, any of the various components described herein and/or depicted in the Figures may be combined, interchanged or excluded from other embodiments.

It is to be understood that whilst present principals have been described with reference to some example embodiments, these are not intended to be limiting, and that various alternative arrangements may be used to implement the subject matter claimed herein. Accordingly, while particular techniques and devices are herein shown and described in detail, it is to be understood that the subject matter which is encompassed by the present application is limited only by the claims.

What is claimed is:

1. A device, comprising:
    a processor system; and
    storage accessible to the processor system and comprising instructions executable by the processor system to:
    responsive to a user query, parse data related to a video to identify discrete steps that conform to the user query, the discrete steps being steps in a workflow indicated in the video;
    based on identifying the discrete steps, chunk the video into different segments that are associated with different respective discrete steps;
    embed the different segments in vector space for a large language model (LLM) to retrieve and present one or more of the different segments in conformance with the user query; and
    execute the LLM to retrieve and present the one or more different segments in conformance with the user query.

2. The device of claim 1, wherein the instructions are executable to:
    embed the different segments in vector space as respective vector embeddings; and
    use the LLM to execute retrieval-augmented generation (RAG) using one or more of the respective vector embeddings to present, on the display, first and second steps from the workflow in conformance with the user query.

3. The device of claim 1, wherein the LLM is established at least in part by a generative pretrained transformer (GPT).

4. The device of claim 1, wherein chunking the video into different segments comprises creating a separate video file for each of the different segments and storing the separate video files for presentation in conformance with the user query.

5. The device of claim 1, wherein chunking the video into different segments comprises storing respective start playback times for each of the different segments so that the video may be accessed at a later time and played back from a particular stored start time in conformance with the user query.

6. The device of claim 1, wherein chunking the video into different segments comprises inserting playback markers into the video so that scrolling through a playback timeline of the video results in different markers for different workflow steps being presented.

7. The device of claim 1, wherein the instructions are executable to:
    execute a generative model to create a three dimensional (3D) model of an object shown in the video; and
    present the 3D model responsive to the user query.

8. The device of claim 7, wherein the generative model comprises a generative image model.

9. A method, comprising:
    responsive to a user query, parsing data related to a video to identify discrete steps that conform to the user query, the discrete steps being steps in a workflow indicated in the video;
    based on identifying the discrete steps, chunking the video into different segments that are associated with different respective discrete steps;
    embedding the different segments in vector space for a large language model (LLM) to retrieve and present one or more of the different segments in conformance with the user query; and
    execute the LLM to retrieve and present the one or more different segments in conformance with the user query.

10. The method of claim 9, wherein the LLM is established at least in part by a generative pretrained transformer (GPT).

11. The method of claim 9, comprising:
    embedding the different segments in vector space as respective vector embeddings; and
    using the LLM to execute retrieval-augmented generation (RAG) using one or more of the respective vector embeddings to present, on a display, first and second steps from the workflow in conformance with the user query.

12. The method of claim 9, wherein chunking the video into different segments comprises creating a separate video file for each of the different segments and storing the separate video files for presentation in conformance with the user query.

13. The method of claim 9, comprising:
    executing a generative model to create a three dimensional (3D) model of an object shown in the video; and
    presenting the 3D model responsive to the user query.

14. At least one computer readable storage medium (CRSM) that is not a transitory signal, the at least one CRSM comprising instructions executable by a processor system to:
    responsive to a user query, parse data related to a video to identify discrete steps that conform to the user query, the discrete steps being steps in a workflow indicated in the video;
    based on identifying the discrete steps, present, on a display, text and images that indicate the discrete steps, the text and images being different from the video;
    wherein the instructions are executable to:
    parse the video to identify discrete steps in the workflow using natural language processing and action recognition software; and
    based on identifying the discrete steps, embed, in vector space, data indicating different segments of the video that are associated with different respective discrete steps for a large language model (LLM) to present one or more of the segments in conformance with the user query.

15. The at least one CRSM of claim 14, wherein the LLM is established at least in part by a generative pretrained transformer (GPT).

16. The at least one CRSM of claim 14, wherein the instructions are executable to:
    embed the different segments in vector space as respective vector embeddings; and
    use the LLM to execute retrieval-augmented generation (RAG) using one or more of the respective vector embeddings to present, on a display, first and second steps from the workflow in conformance with the user query.

17. The at least one CRSM of claim 14, wherein chunking the video into different segments comprises creating a separate video file for each of the different segments and storing the separate video files for presentation in conformance with the user query.

18. The at least one CRSM of claim 14, wherein chunking the video into different segments comprises storing respective start playback times for each of the different segments so that the video may be accessed at a later time and played back from a particular stored start time in conformance with the user query.

19. The at least one CRSM of claim 14, wherein chunking the video into different segments comprises inserting playback markers into the video so that scrolling through a playback timeline of the video results in different markers for different workflow steps being presented.

20. The at least one CRSM of claim 14, wherein the instructions are executable to:

execute a generative model to create a three dimensional (3D) model of an object shown in the video; and present the 3D model responsive to the user query.

* * * * *